(12) United States Patent
Matsumoto et al.

(10) Patent No.: US 7,447,285 B2
(45) Date of Patent: Nov. 4, 2008

(54) DATA PROCESSING METHOD, RECEIVER AND NETWORK ELEMENT FOR EXECUTING A TURBO PRINCIPLE

(75) Inventors: Tadashi Matsumoto, Oulu (FI); Kimmo Kansanen, Oulu (FI); Mariella Särestöniemi, Oulu (FI)

(73) Assignee: Nokia Corporation, Espoo (FI)

( * ) Notice: Subject to any disclaimer, the term of this patent is extended or adjusted under 35 U.S.C. 154(b) by 771 days.

(21) Appl. No.: 10/640,566

(22) Filed: Aug. 14, 2003

(65) Prior Publication Data

US 2004/0247061 A1   Dec. 9, 2004

(30) Foreign Application Priority Data

Jun. 5, 2003   (FI)   .................. 20030845

(51) Int. Cl.
*H03D 1/04*   (2006.01)
*H03D 1/06*   (2006.01)
(52) U.S. Cl. ...................... 375/346; 375/348
(58) Field of Classification Search ............. 375/346, 375/348
See application file for complete search history.

(56) References Cited

U.S. PATENT DOCUMENTS

| | | | | |
|---|---|---|---|---|
| 4,791,590 | A * | 12/1988 | Ku et al. .................. | 708/404 |
| 4,958,348 | A * | 9/1990 | Berlekamp et al. ........ | 714/784 |
| 5,121,429 | A * | 6/1992 | Guppy et al. .............. | 380/30 |
| 5,835,129 | A * | 11/1998 | Kumar .................... | 348/14.09 |
| 6,122,320 | A * | 9/2000 | Bellifemine et al. ...... | 375/240 |
| 6,215,814 | B1 * | 4/2001 | Ylitalo et al. ............. | 375/148 |
| 6,256,763 | B1 * | 7/2001 | Oh et al. .................. | 714/784 |
| 6,304,994 | B1 * | 10/2001 | Oh et al. .................. | 714/784 |
| 6,405,185 | B1 * | 6/2002 | Pechanek et al. .......... | 708/41 |
| 6,529,545 | B2 * | 3/2003 | Tiirola et al. ............. | 375/148 |
| 6,973,470 | B2 * | 12/2005 | Takahashi et al. ......... | 708/491 |
| 2001/0017883 | A1 * | 8/2001 | Tiirola et al. ............. | 375/148 |

OTHER PUBLICATIONS

H. T. Kung and Charles E. Leiserson, "Algorithms for VLSI processor arrays," Chapter 8.3 of Introduction to VLSI Systems by Carver A. Mead and Lynn A. Conway, Addison-Wesley, 1978.*
Kansanen, K. et al., "*A Computationally Efficient MIMO turbo-Equaliser*", Vehicular Technology Conference, 2003 The 57th IEEE, vol. 1, pp. 277-279, Apr. 22-25, 2003.
Shadafan, et al., "*Dynamic neural Network Architecture by sequential Partitioning of the input space[1]*", IEE International Conference on Neural Networks, Mar. 28-Apr. 1, 1993. vol. 1, pp. 226-231.
Adaptive Filter Theory, Haykin Simon, 3rd Edition. Prentice Hall, 1996. pp. 565-566.
Ziemer, R.E., et al., "Principles of Communications, Systems, Modulation, and Noise," Houghton Mifflin Company, Boston, Second Edition, 1985, pp. 415-427.

* cited by examiner

*Primary Examiner*—David C. Payne
*Assistant Examiner*—Nader Bolourchi
(74) *Attorney, Agent, or Firm*—Squire, Sanders & Dempsey, L.L.P.

(57) ABSTRACT

A data processing method in a receiver of a communication system, a receiver and a network element is provided. A receiver of a communication system includes: means for estimating interference of a received signal, means for formulating components of an interference covariance matrix from the received signal, means for carrying out iterative calculation by a systolic array where partial computational results are forwarded from one calculation module to the next calculation module so that the result of the iterative calculation being the inverse matrix of the interference covariance matrix, wherein the inverse matrix is used in channel equalization.

25 Claims, 3 Drawing Sheets

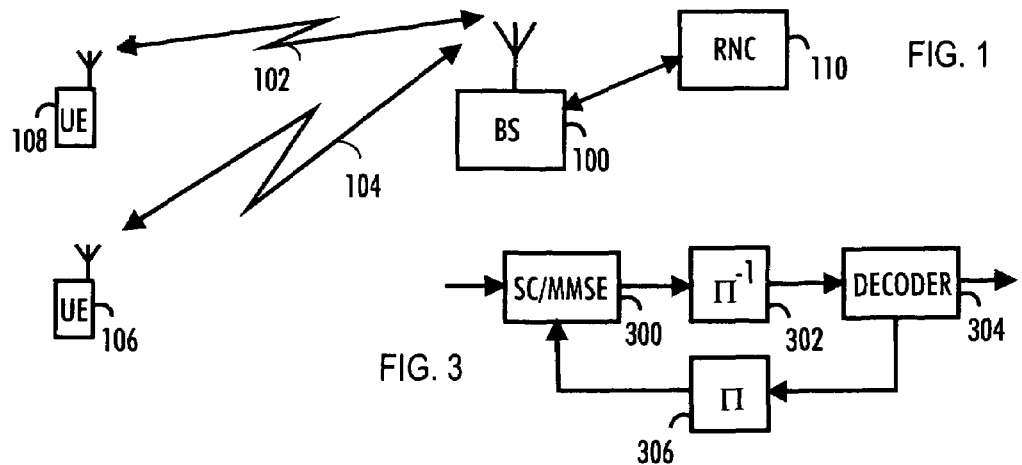
FIG. 1
FIG. 3
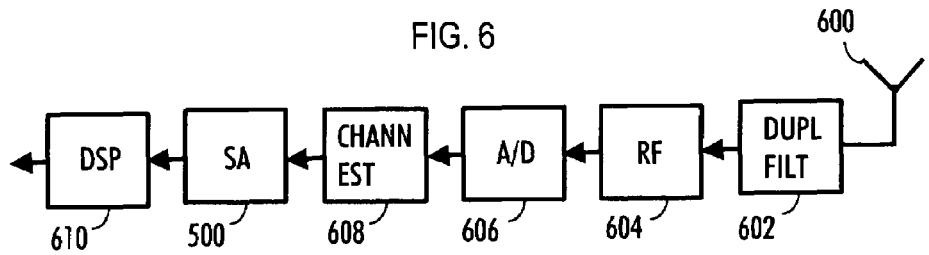
FIG. 6
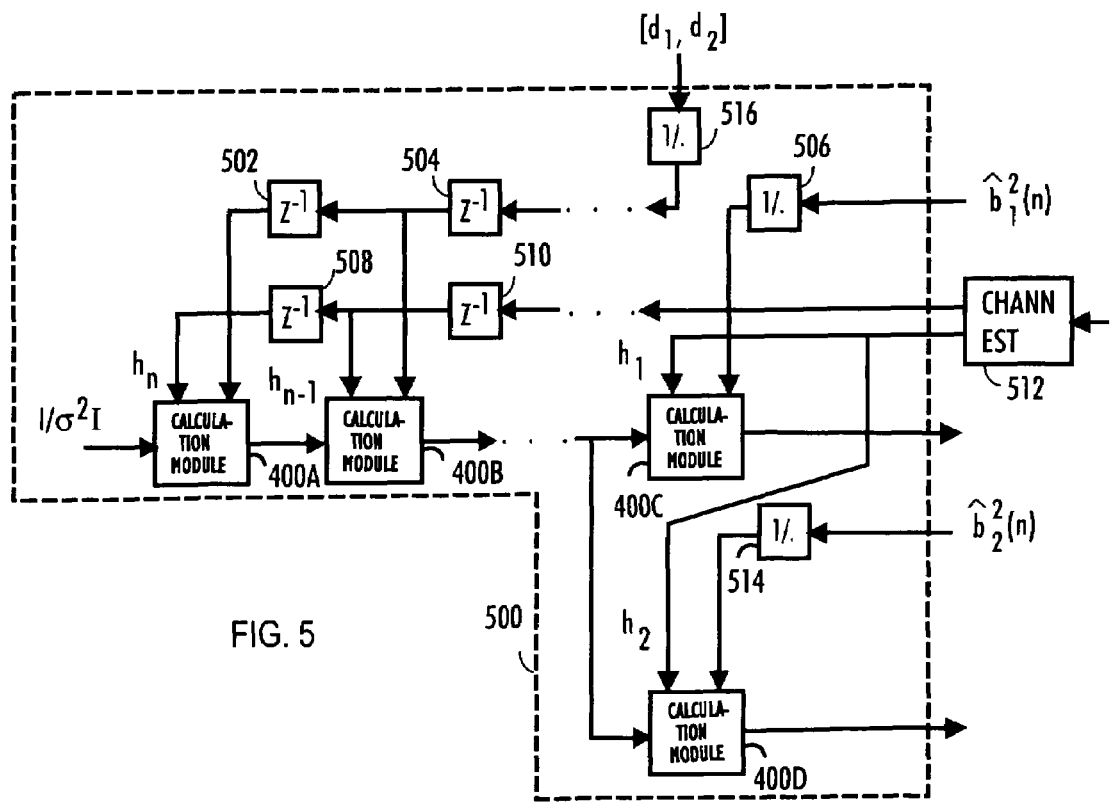
FIG. 5

DATA PROCESSING METHOD, RECEIVER AND NETWORK ELEMENT FOR EXECUTING A TURBO PRINCIPLE

BACKGROUND OF THE INVENTION

1. Field of the Invention

The invention relates to a data processing method in a receiver of a communication system, a receiver and a network element.

2. Description of the Related Art

Since the beginning of information and coding theory, the objective has been to come as close as possible to the Shannon limit performance. Iterative processing techniques, usually called the turbo principle, have lead to improvement in signal processing in receivers so that the Shannon capacity has effectively been achieved. In the turbo principle, soft information is exchanged between different blocks in a communication receiver.

It is possible to apply the turbo principle to many detection/decoding problems, such as channel estimation, channel equalization, coded modulation, multi-user detection and channel decoding.

A minimum mean-square error (MMSE) algorithm is widely used in prior art equalizers. A MMSE criterion seeks tap weights that minimize the mean-square error between the desired output and actual output of an equalizer.

The problem is computational complexity, which typically lies in the computation of MMSE incorporating an inverse covariance matrix.

SUMMARY OF THE INVENTION

The invention provides an improved method, receiver and a network element. According to an embodiment of the invention, there is provided a data processing method in a receiver of a communication system. The method includes: estimating interference from a received signal, formulating components of an interference covariance matrix of the interference cancelled received signal, formulating calculation terms from the components of the interference covariance matrix utilizing a matrix inversion lemma and creating calculation modules using the calculation terms, wherein the calculation modules have the same structure, connecting the calculation modules for generating a systolic array, wherein the systolic array carries out iterative calculation where partial computational results are forwarded from one calculation module to the next calculation module so that the result of the iterative calculation is the inverse matrix of the interference covariance matrix, wherein the inverse matrix is used in channel equalization.

According to another embodiment of the invention, there is provided a receiver of a communication system including: means for estimating interference from a received signal, means for formulating components of an interference covariance matrix of the received signal, means for carrying out iterative calculation by a systolic array where partial computational results are forwarded from one calculation module to the next calculation module so that the result of the iterative calculation is the inverse matrix of the interference covariance matrix, wherein the inverse matrix is used in channel equalization.

According to another embodiment of the invention, there is provided a network element of a communication system including: means for estimating interference from a received signal, means for formulating components of an interference covariance matrix of the received signal, means for carrying out iterative calculation by a systolic array where partial computational results are forwarded from one calculation module to the next calculation module so that the result of the iterative calculation is the inverse matrix of the interference covariance matrix, wherein the inverse matrix is used in channel equalization.

According to another embodiment of the invention, there is provided a receiver of a communication system, configured to: estimate interference from a received signal, formulate components of an interference covariance matrix of the received signal, carry out iterative calculation by a systolic array where partial computational results are forwarded from one calculation module to the next calculation module so that the result of the iterative calculation being the inverse matrix of the interference covariance matrix, wherein the inverse matrix is used in channel equalization.

According to another embodiment of the invention, there is provided a network element of a communication system, configured to: estimate interference from a received signal, formulate components of an interference covariance matrix of the received signal, carry out iterative calculation by a systolic array where partial computational results are forwarded from one calculation module to the next calculation module so that the result of the iterative calculation being the inverse matrix of the interference covariance matrix, wherein the inverse matrix is used in channel equalization.

The method and system of the invention provide several advantages. In one embodiment of the invention, the speed of the calculation is higher than in the prior art solutions. Another advantage is that the identical structure of the modules of the systolic array makes the device easier to produce during production. The systolic array is also a flexible structure. Namely, it can be adjusted according to parameters affecting the dimensionality of MMSE calculation, such as the length of a channel response and the number of antennas.

BRIEF DESCRIPTION OF THE DRAWINGS

In the following, the invention will be described in greater detail with reference to the preferred embodiments and the accompanying drawings, in which FIG. 1 shows an example of a communication system which may be employed according to one embodiment in the invention;

FIG. 3 shows an example of a soft interference canceller/Minimum-Mean-Square Equalizer (SC/MMSE) turbo receiver structure according to one embodiment of the invention;

FIG. 5 shows an example of a systolic array according to one embodiment of the invention; and FIG. 6 shows an example of a receiver according to one embodiment of the invention.

DETAILED DESCRIPTION OF THE PREFERRED EMBODIMENTS

With reference to FIG. 1, an example of a data transmission system to which the embodiments of the invention can be applied is shown. The invention can be applied to various wireless communication systems. One example of such a communication system is a UMTS (Universal Mobile Telecommunications System) radio access network. The UMTS radio access network is a radio access network which includes WCDMA (wideband code division multiple access) technology and can offer also real-time IP-based (Internet Protocol) services, which are, for example, IP telephony (IPT), IP-based streaming and IP-multimedia via a connection to an IP-network. The embodiments are not, however, restricted to the system given as an example but one skilled in the art may apply the solution to other radio systems provided with the necessary properties.

It is clear to one skilled in the art that the method according to the invention can be applied to systems utilizing different modulation methods or air interface standards. FIG. 1 is a simplified illustration of a digital data transmission system to which the solution according to the invention is applicable. FIG. 1 illustrates a part of a cellular radio system, which includes a base station (or a node B) 100, which has bi-directional radio links 102 and 104 to subscriber terminals 106 and 108. The subscriber terminals may be fixed, vehicle-mounted or portable. The base station includes transmitters, for instance. From the transceivers of the base station there is a connection to an antenna unit, which establishes the bi-directional radio links to the subscriber terminal. The base station is further connected to a radio network controller 110, which transmits the connections of the terminals to the other parts of the network. The base station controller controls in a centralized manner several base stations connected to it.

The cellular radio system can also communicate with other networks, such as a public switched telephone network or the Internet.

Figure 2:
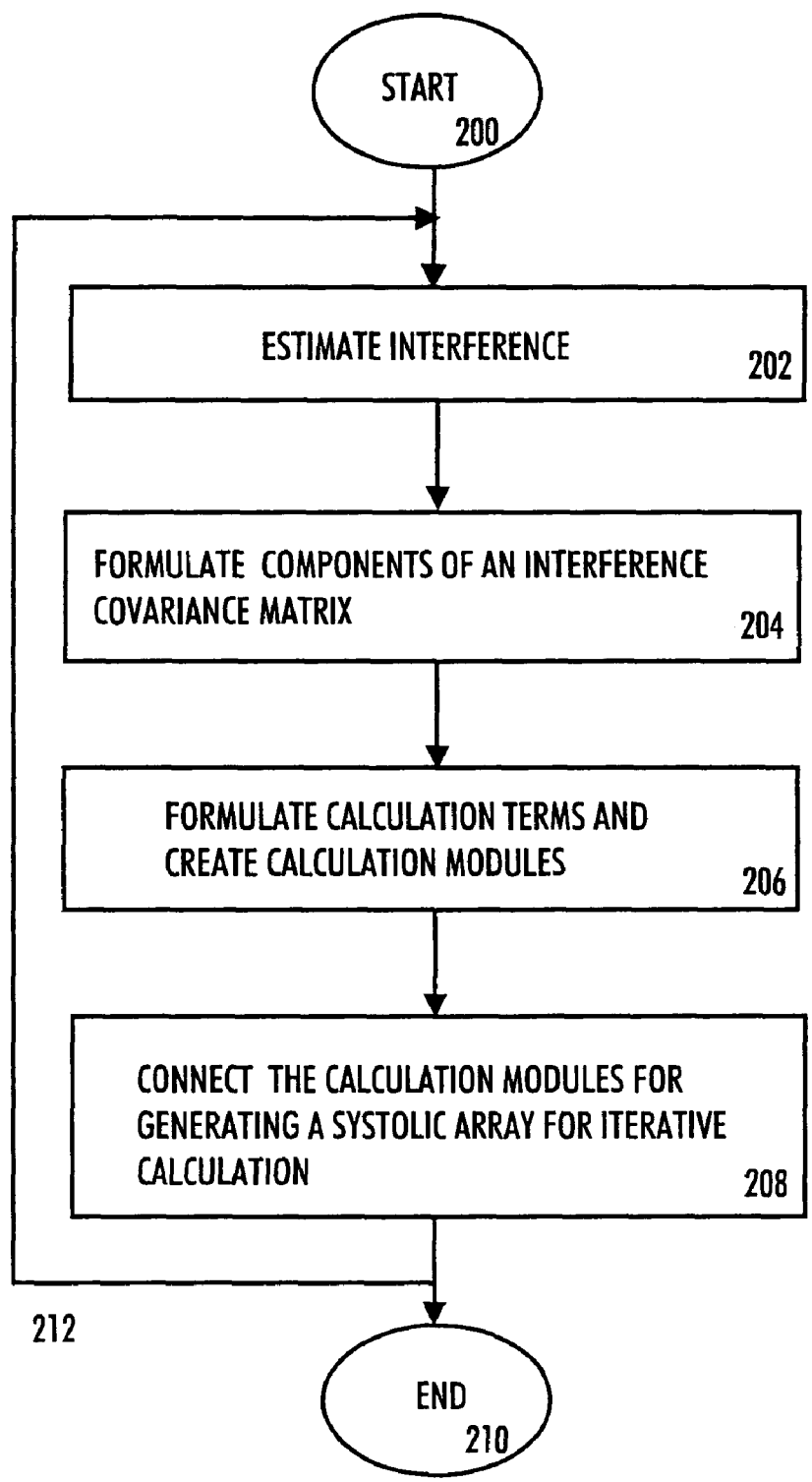
FIG. 2 is a flow chart of the method of processing data according to one embodiment of the invention.

FIG. 2 is a flow chart describing an embodiment of the invention. The invention is related to a method for executing a turbo principle in a receiver of a communication system. Briefly, the turbo principle means that soft information typically including quality information is exchanged between different blocks in a communication receiver. Thus, the turbo principle is an iterative process. The quality information that is also called reliability information may be a posteriori probability information, for instance. The embodiment is used in a channel equalizer.

It is possible to apply the turbo principle to many detection/decoding problems such as channel estimation, channel equalization, coded modulation, multi-user detection and channel decoding. The example depicted in FIG. 3 relates to equalization. Equalization is required because of inter-symbol interference (ISI) resulting from multi-path propagation. The equalizer depicted in the example shown in FIG. 3 includes a soft interference canceller (SC) followed by an MMSE filter (Minimum-Mean-Square Equalizer) optimized with the knowledge of channel decoder feedback, channel response and noise level. The SC/MMSE equalizer uses the knowledge of transmitted bits. The principle of turbo equalization applied to the usage of an SC/MMSE algorithm leads to a structure where the likelihood information is exchanged between the SC/MMSE equalizer and a decoder through interleaving/de-interleaving blocks. The SC/MMSE turbo receiver structure can be applied not only to the equalization of inter-symbol interference for single-carrier signaling but also to various other signaling schemes, such as multiple signal detection and detection in multiple-input-multiple-output (MIMO) systems. An example of the SC/MMSE turbo receiver structure is shown in FIG. 3. The SC/MMSE equalizer 300 is connected to the decoder 304 via a de-interleaver 302. The decoder feeds back a priori information regarding the value of the symbols transmitted to the SC/MMSE equalizer 300 via an interleaver 306. The method is used in a channel equalizer.

The embodiment discussed in FIG. 2 begins in block 200. In block 202 the interference in a radio channel is estimated. The interference estimation is known in the art and it is therefore not explained here in further detail. One method widely used for performing interference estimation is measuring the impulse response of a received signal. If there are several radio channels of interest, interference is usually estimated in these channels. In a multi-user system, the interference can be estimated for every user in a multi-user system or a common interference estimate is used. In the example provided in this description, the received signal is modeled with the linear model:

$$r(n)=H(n)b(n)+w(n), \quad \text{Equation (1)}$$

where

H(n) is a channel response matrix during time n, b(n) is a symbol vector containing symbol transmitted during time n and a predetermined number of previous L−1 symbols and L−1 following symbols, where L is a channel memory length, w(n) is a complex noise vector during time n with variance $\sigma_w^2$.

In block 204, components of an interference covariance matrix of the received signal are formulated. This is typically carried out after partial interference cancellation. This discussion provides an example of an interference covariance matrix for channel coded BPSK-modulated (binary phase shift keying) systems. The exemplary covariance matrix of the received signal after the cancellation of interference components is:

$$\Theta(n)=H(n)[diag(1-\hat{b}^2(n))]H^H(n)+\sigma_w^2 I+h(n)(\hat{b}^2(n))h^H(n), \quad \text{Equation (2)}$$

where

H is a channel response matrix, $(.)^H$ means matrix conjugate transpose, h(n) is the nth column of H(n), I is an identity matrix, $\sigma_w^2$ is variance of the noise, $\hat{b}(n)$ is the soft symbol estimate of the nth symbol calculated as $$\hat{b}(n) = \tanh\left(\frac{\lambda_0}{2}\right), \quad \text{Equation (3)}$$

where $\lambda_0$ is the a priori likelihood information on the value of a transmitted symbol, which is the information that a decoder provides for the SC/MMSE equalizer. The exemplary covariance matrix of the interference component of the received signal after cancellation is:

$$\Theta(n)=H(n)[diag(1-\hat{b}^2(n))]H^H(n)+\sigma_w^2 I, \quad \text{Equation (4)}$$

where

H is a channel response matrix, $(.)^H$ means a matrix conjugate transpose,

I is an identity matrix, $\sigma_w^2$ is variance of the noise, $\hat{b}(n)$ is the soft symbol estimate of the nth symbol calculated as $$\hat{b}(n) = \tanh\left(\frac{\lambda_0}{2}\right),$$

where $\lambda_0$ is the a priori likelihood information on the value of a transmitted symbol, which is the information that a decoder provides for the SC/MMSE equalizer.

As can be seen from equation (4), the inversion of the matrix $\Theta(n)$ is complicated and, therefore, requires a lot of calculation capacity, because the matrix explicit inversion is of a cubical order.

Therefore, in block 206 in FIG. 2, calculation terms are formed from the components of the interference covariance matrix using a matrix in-version lemma, and calculation modules similar to each other are created using the calculation terms. The matrix inversion lemma for a square matrix A is:

$$A^{-1} = (B + Cd^{-1}C^H)^{-1} \quad \text{Equation (5)}$$
$$= B^{-1} - B^{-1}C(d + C^H B^{-1}C)^{-1}C^H B^{-1}$$

The matrix inversion lemma is expressed in Adaptive Filter Theory, Haykin Simon, 3$^{rd}$ edition, Prentice Hall, 1996, page 565, which is incorporated herein by reference.

The adaptation of equation (5) to equation (4) produces the following calculation terms:

$$B = \sigma_w^2 I + \sum_{k=n-L+1}^{n+L-1} h_k(n)\left(1 - \hat{b}_k^2\right)h_k^H(n) \quad \text{Equation (6)}$$
$$C^H = h^H(n)$$
$$d^{-1} = 1 - \hat{b}^2(n)$$
$$C = h_k(n),$$

where $(.)^H$ means a matrix conjugate transpose, $h_k(n)$ is the kth column of H(n), H(n) being a channel response matrix, I is an identity matrix, $\sigma_w^2$ is variance of the noise, $\hat{b}(k)$ is a soft symbol estimate of kth symbol, $h(n)$ is the nth column of H(n), $\hat{b}(n)$ is the soft symbol estimate of the nth symbol calculated as $$\hat{b}(n) = \tanh\left(\frac{\lambda_0}{2}\right),$$

$\lambda_0$ is the a priori likelihood information on the value of a transmitted symbol, which is the information that a decoder provides for the SC/MMSE equalizer, L is the length of the multi-path channel. Typically, over-sampling or multiple antennas are used.

It is also possible to take the desired information $h(n)(\hat{b}^2(n))h^H(n)$ into consideration when the calculation term B is determined, in which case the calculation term B of equation (6) will become:

$$\sigma_w^2 + \sum_{k=n-L+1}^{n+L-1} h_k(n)\left(1 - \hat{b}(k)\right)h_k^H(n) + h(n)\left(\hat{b}^2(n)\right)h^H(n) \quad \text{Equation (7)}$$

The calculation terms may also be referred to as data buses or internal signals.

The matrix inversion lemma given by equation (4) can be used when inverting the matrix B. Thus, the calculation modules are connected for generating a systolic array and the inversion of the covariance matrix (2) is carried out using iterative calculation, where each covariance matrix component is incorporated into the inverse by one calculation module. The number of modules depends, for instance, on the size of the matrix to be inverted that in turn depends on the length of a channel filter. The length of the channel filter is determined on the basis of the length of a channel response, sample rate and/or the number of antennas. The result of the iterative calculation is the inverse matrix of the interference covariance matrix. The inverse matrix is used in MMSE processing.

Since the matrix $B^{-1}$ is the inverse of a sum of vector outer products, the inverse can be constructed by applying the matrix inversion lemma equation (4) repeatedly. The calculation terms of equation (5) are calculated for each symbol when the previous cumulative inverse is used for calculating a new outer product. The calculation is implemented as a systolic array, where each calculation module performs one iteration and the last module in the array of the implementation produces the final matrix inverse. The initial value includes the matrix $\sigma_w^2 I$ that is the inverse of the noise variance matrix of the received signal, the last (nth) value of the impulse response matrix hn and the feedback information delayed by delay elements. This is performed in block 208.

The method ends in block 210. Arrow 212 illustrates that the method may be reiterative. The method may be repeated for the next symbol n+1 by defining the partial matrix H(n+1) where the oldest buffered interference component is discarded and a new component is introduced. The channel equalization is made on the basis of the determined inversed covariance matrix.

Figure 4:
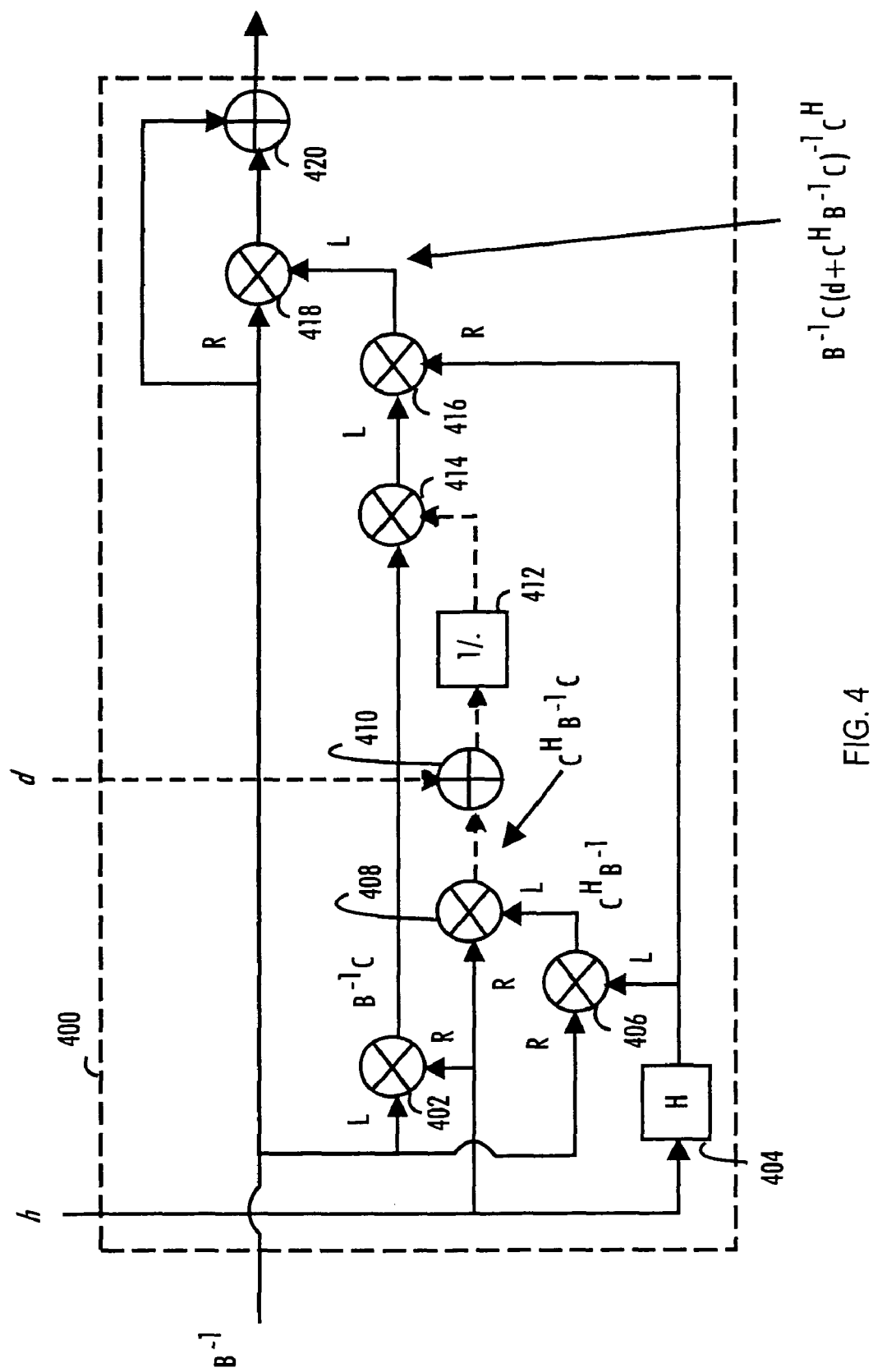
FIG. 4 illustrates an example of a calculation module according to one embodiment of the invention.

FIG. 4 illustrates an example of a calculation module 400 for implementing the calculation of the covariance matrix inversion described above. The letters L and R indicate the left and right side of the multiplications shown in the figure. The terms used are according to equations (4), (5) and (6).

The vector value $B^{-1}$ is the inverse matrix and the input value h is a channel response vector for a current symbol. The channel response value is conveyed to block 404 where conjugate transpose is calculated. The input matrix $B^{-1}$ is first transferred to multipliers 402, 406. The multiplier 402 calculates the multiplication of the channel response value and the matrix $B^{-1}$, the result being the calculation term $B^{-1}C$, and the multiplier 406 calculates the multiplication of a conjugate transpose of the channel response value and the matrix $B^{-1}$, the result being the calculation term $C^H B^{-1}$.

The matrix $B^{-1}$ is also conveyed to a multiplier 408, and the result of the multiplication is the calculation term $C^H B^{-1}C$.

The calculation term $C^H B^{-1} C$ and the scalar d are added in the adder 410, and the result is then inversed in block 412.

The output of block 412 and the output of block 402 are conveyed to a multiplier 414. The result of the multiplication calculated in block 414 is then conveyed to a multiplier 416 where the multiplication with the output of block 404 is calculated, the result being the calculation term $B^{-1}C(d+C^H B^{-1} C)^{-1} C^H$.

The calculation term is conveyed to a multiplier 418 where the multiplication with the matrix $B^{-1}$ is calculated. The output of the calculation module 400 is the result of adder 420, which is $B^{-1} - B^{-1} C(d+C^H B^{-1} C)^{-1} C^H B^{-1}$.

FIG. 5 shows an example of a systolic array 500, which includes a number of calculation modules described above. The number of calculation modules may vary according to the implementation. The number of calculation modules is determined, for example, on the basis of the number of transmission antennas or the number of users. Other parameters that may affect the number of calculation modules are, for instance, the length of the impulse response or the number of simultaneous users.

In this embodiment, there are depicted calculation modules 400A-400D forming a systolic array. The calculation modules are connected to each other for carrying out the iterative calculation explained above.

Input information to the first calculation module of the array 400A includes the matrix $\sigma_w^2 I$ which is the inverse of the noise variance matrix of the received signal, the last (nth) vector of the impulse response matrix $h_n$ and the feedback information from a decoder. A soft symbol estimate of the symbol of interest and a predetermined number of previous symbols and following symbols are delayed by delay elements 502, 504 for synchronizing the symbols with the information processed in each calculation module. The symbols are also inverted in block 516. The information from channel estimation 512, i.e. the impulse response matrix vectors $h_n$, $h_{n-1}, \ldots, h_1$, is also delayed for synchronization. In the embodiment of FIG. 5, there are depicted delay elements 508, 510 for this purpose. The number of delay elements depends on the length of the array. Delay elements are known in the art and are not explained here in further detail.

The input information for the following calculation modules includes the output of the previous calculation module, in other words the term $B^{-1}$, the delayed feedback soft information and the impulse response matrix value h which is the first term left in the covariance matrix.

In FIG. 5, there is also depicted an additive structure of a systolic array for multi-user detection or detection of multi-antenna transmissions. In a preferred embodiment, the structure of the systolic array is the same for all users or signals (calculation modules 400A and 400B) until the final stage (calculation modules 400C and 400D). In the final stage, there are as many inversion blocks and last calculation modules as there are signals or users to be detected. In FIG. 5, there is shown one additive final stage as an example (calculation modules 400C and 400D). The feedback information, $\hat{b}_1^2(n)$ regarding the first user or signal and $\hat{b}_2^2(n)$ regarding the second user or signal, for the last calculation modules 400C and 400D is a priori likelihood information regarding the value of the transmitted symbol that the decoder provides for the SC/MMSE equalizer. The value $\hat{b}_1^2(n)$ is inverted in block 506 and the value $\hat{b}_2^2(n)$ is inverted in block 514.

Channel estimates $h_1$ and $h_2$ as well as the symbol (or bit) estimates $\hat{b}_1^2(n)$ and $\hat{b}_2^2(n)$ stand for the desired interference, being situated in the middle of the period of interest.

The input values of the inverters 506, 514, 516 of the systolic array may be limited from the process discussed below with regard to FIG. 6, and the input inverters 506, 514, 516 may also be limited by a given threshold. The threshold is determined in such a way that the numerical stability is guaranteed.

FIG. 6 shows an example of a receiver of a network element. The receiver uses in this example the same antenna 600 as a transmitter and therefore there is also a duplex filter 602 to separate transmission and reception. The antenna may be an antenna array or a single antenna. In a receiver, RF parts 604 in this example also include a power amplifier, which amplifies the received signal attenuated on a radio path. Typically, RF parts down-convert a signal to an intermediate frequency and then to a base band frequency or straight to a base band frequency. An analog-to-digital converter 606 converts an analog signal to digital form by sampling and quantizing.

A channel estimator 608 estimates interference from a received signal and formulates components of an interference covariance matrix of the interference cancelled received signal. The interference estimation is known in the prior art.

The systolic array described above is shown in block 500 in FIGS. 5 and 6. The implementation solution of the systolic array 500 may, for instance, be an ASIC (Application Specific Integrated Circuit) component.

The Digital Signal Processing (DSP) unit is block 610. Typical functions of a DSP block include de-scrambling, decoding, de-interleaving etc. The basics of the digital signal processing are known in the art.

Even though the invention has been described above with reference to an example according to the accompanying drawings, it is clear that the invention is not restricted thereto but can be modified in several ways within the scope of the appended claims.

The invention claimed is:

1. A method comprising:
   estimating interference from a received signal;
   formulating components of an interference covariance matrix of an interference cancelled received signal;
   formulating calculation terms from the components of the interference covariance matrix utilizing a matrix inversion lemma;
   creating calculation modules using the calculation terms, wherein the calculation modules have a same structure; and
   connecting the calculation modules for generating a systolic array, wherein the systolic array performs iterative calculation where partial computational results are forwarded from one calculation module to the next calculation module, the partial computational results of the iterative calculation being an inverse matrix of the interference covariance matrix, wherein the inverse matrix is used in channel equalization for removing interference from the received signal,
   wherein connecting comprises connecting the calculation modules for generating the systolic array, wherein the inverse matrix uses a soft interference canceller minimum mean-square equalizer to perform the channel equalization.

2. A method comprising:
   estimating interference from a received signal;
   formulating components of an interference covariance matrix of an interference cancelled received signal;
   formulating calculation terms from the components of the interference covariance matrix utilizing a matrix inversion lemma;
   creating calculation modules using the calculation terms, wherein the calculation modules have a same structure; and connecting the calculation modules for generating a systolic array, wherein the systolic array performs iterative calculation where partial computational results are forwarded from one calculation module to the next calculation module, the partial computational results of the iterative calculation being an inverse matrix of the interference covariance matrix, wherein the inverse matrix is used in channel equalization for removing interference from the received signal, wherein creating comprises creating a number of the calculation modules based on at least one of a number of antennas, a number of samples, a length of the impulse response and a number of simultaneous users.

3. The method of claim 1, wherein estimating comprises estimating the interference for at least one user of a multi-user system.

4. The method of claim 1, wherein estimating comprises estimating a common interference estimate which is used in a multi-user system.

5. The method of claim 1, wherein connecting comprises connecting the calculation modules for generating the systolic array, wherein the systolic array performs the iterative calculation so that data fed back from the one calculation module to the next calculation module comprises soft information.

6. An apparatus, comprising:
an estimator configured to estimate interference from a received signal;
a formulator configured to formulate components of an interference covariance matrix of the received signal; and
a performer configured to perform iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal,
wherein the performer further comprises a soft interference canceller minimum mean-square equalizer used in performing the channel equalization.

7. An apparatus, comprising:
an estimator configured to estimate interference from a received signal;
a formulator configured to formulate components of an interference covariance matrix of the received signal; and
a performer configured to perform iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal,
wherein a number of the calculation modules is determined based on at least one of a number of antennas, a number of samples, a length of the impulse response and a number of simultaneous users.

8. The apparatus of claim 6, wherein the estimator estimates the interference for at least one user in a multi-user system.

9. The apparatus of claim 6, wherein the estimator estimates a common interference estimate which is used in a multi-user system.

10. The apparatus of claim 6, wherein the performer performs the iterative calculation so that data fed back from the one calculation module to the next calculation module comprises soft information.

11. An apparatus, comprising:
an estimator configured to estimate interference from a received signal;
a formulator configured to formulate components of an interference covariance matrix of the received signal;
a performer configured to perform iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal; and
a number of inversion blocks and last calculation modules which corresponds to a number of signals or a number of users to be detected.

12. An apparatus, comprising:
an estimator configured to estimate interference from a received signal;
a formulator configured to formulate components of an interference covariance matrix of the received signal; and
a performer configured to perform iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal,
wherein the performer further comprises a soft interference canceller minimum mean-square equalizer used in performing the channel equalization.

13. An apparatus, comprising:
an estimator configured to estimate interference from a received signal;
a formulator configured to formulate components of an interference covariance matrix of the received signal; and
a performer configured to perform iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal,
wherein a number of the calculation modules is determined based on at least one of a number of antennas, a number of samples, a length of the impulse response and a number of simultaneous users.

14. The apparatus of claim 12, wherein the estimator estimates the interference for at least one user in a multi-user system.

15. The apparatus of claim 12, wherein the estimator estimates a common interference estimate which is used in a multi-user system.

16. The apparatus of claim 12, wherein the performer performs the iterative calculation so that data fed back from the one calculation module to the next calculation module comprises soft information.

17. The apparatus of claim 12, further comprising:

a receiver comprising a number of inversion blocks and last calculation modules which corresponds to a number of signals or a number of users to be detected.

18. An apparatus, comprising:

estimating means for estimating interference from a received signal;

formulating means for formulating components of an interference covariance matrix of the received signal; and performing means for performing iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal, wherein the performing means further comprises a soft interference canceller minimum mean-square equalizer used in performing the channel equalization.

19. An apparatus, comprising:

estimating means for estimating interference from a received signal;

formulating means for formulating components of an interference covariance matrix of the received signal; and performing means for performing iterative calculation by a systolic array where partial computational results are forwarded from one calculation module to a next calculation module, the partial computational results of the iterative calculation being an inverse matrix of the interference covariance matrix, wherein the inverse matrix is used in channel equalization for removing interference from the received signal, wherein a number of the calculation modules is determined based on at least one of a number of antennas, a number of samples, a length of the impulse response and a number of simultaneous users.

20. The apparatus of claim 6, wherein the apparatus is a receiver.

21. The apparatus of claim 7, wherein the apparatus is a receiver.

22. The apparatus of claim 11, wherein the apparatus is a receiver.

23. The apparatus of claim 11, wherein the apparatus is a network element.

24. The apparatus of claim 12, wherein the apparatus is a network element.

25. The apparatus of claim 13, wherein the apparatus is a network element.

* * * * *